July 24, 1934.   C. J. SONNER   1,967,909
MIXING FAUCET
Filed March 18, 1932

INVENTOR
CARL J. SONNER
BY
ATTORNEY

Patented July 24, 1934

1,967,909

UNITED STATES PATENT OFFICE 1,967,909

MIXING FAUCET

Carl J. Sonner, Ozone Park, N. Y.

Application March 18, 1932, Serial No. 599,685

3 Claims. (Cl. 299—84)

This invention relates to new and useful improvements in a mixing faucet.

The invention has for an object the construction of a mixing faucet which is characterized by the ability of causing the liquid passed through the solute container to be drawn off.

As another object of this invention it is proposed to arrange a valve within the faucet adapted to control the passage of the liquid to the solute chamber and simultaneously to control the operation of a bleed adapted to cause drawing of the liquid from the solute.

It is a further object of this invention to provide a passage from the solute container to the discharge nozzle of the faucet and to interpose a funnel within this passage and to discharge the bleed supply against the side of the funnel, to accomplish the drawing action.

It is another object of this invention to construct a mixing funnel in a manner so that it is adapted for various purposes such as spraying a garden, mixing coffee and milk to form coffee, or a supply of hot water with tea.

A still further object of this invention is the construction of a device of the class described which is of simple durable construction, dependable in use and efficient in action, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
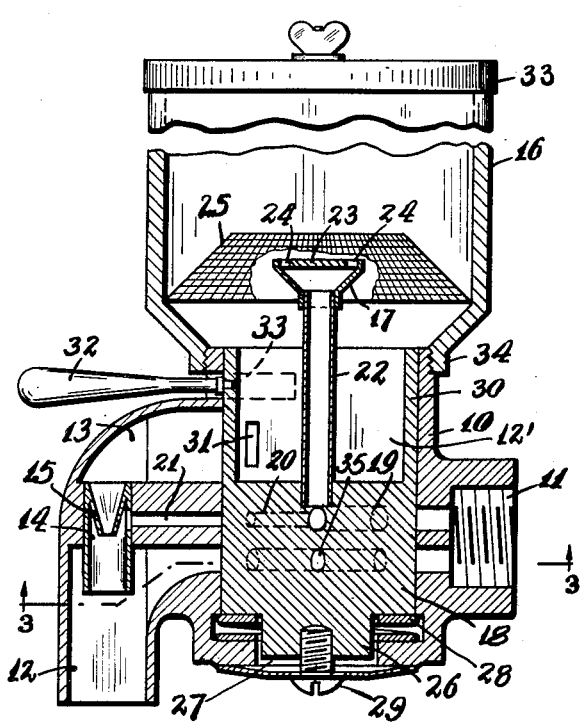
Fig. 1 is a vertical transverse sectional view of a mixing faucet constructed according to this invention.

The mixing faucet includes a body 10 having an inlet 11 for connection with some liquid supply and an outlet 12. A funnel 15 is interposed within the passage 14.

A solute container 16 is mounted upon the top of the body 10 and is in communication with the top chamber 12'. A supply nozzle 17 discharges into the container 16. This spray nozzle is mounted upon a valve 18 rotative in the body 10. The valve 18 is formed with a passage 19 which connects with a bleed 20 adapted to communicate with a bleed section 21 discharging against the side of the funnel 15. The passage 19 connects with a tube 22 which supports the spray nozzle 17. The top of the spray nozzle is closed by a bleed 23 which is formed with a plurality of spray openings 24. A sheet of gauze 25 is engaged over the spray nozzle 17 and is attached within the solute container 16 composing its bottom. This gauze 25 is in the shape of a frusto-conical form to allow the nozzle 17 to extend some distance within the container 16.

The valve 18 has a reduced bottom end 26 which extends through an opening 27 in the bottom of the body 10. A spring 28 is located within this opening and held in place by a screw 29 which has a threaded portion engaging into the reduced end 26. At the top, the valve 18 is formed with a flange 30 which has a side opening 31 allowing communication from the solute container 16 to the chamber 13. The opening 31 communicates with the chamber 13 only when the passage 19 is in communication with the outlet 11. A handle 32 extends through a slot 33 in the valve body 10 and threadedly engages into the side of the flange 30 to provide for the turning of the valve. The container 16 is provided with a removable cover 33 so that solute may be placed therein. The lower end of the container 16 has a threaded neck 34 which threadedly engages upon the top of the valve body 10. The valve 18 is formed with another passage 35 which is in a different plane to the passage 19 and which is adapted to connect the inlet 11 with the outlet 12.

Figure 3:
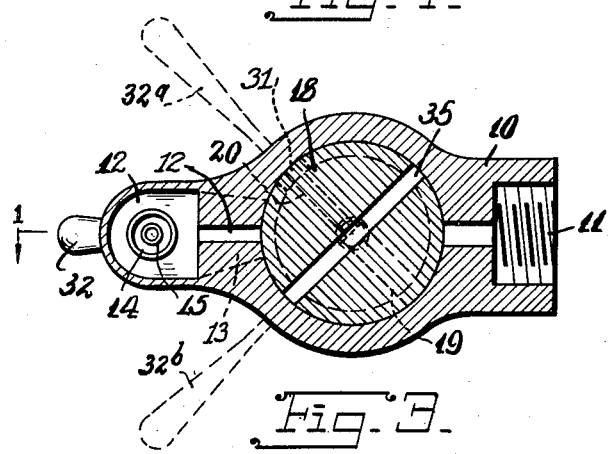
Fig. 3 is a sectional view taken on the line 3—3 of Fig. 1.

In Fig. 3 the handle 32 is shown in a position so that neither of the passages 19 or 35 are in contact with the inlet 11. Dot and dash lines 32$^a$ indicate a moved position of the handle 32 in which the passage 35 will be in a position connecting the inlet 11 with the outlet 12. Dot and dash lines 32$^b$ indicate a position of the handle in which the passage 19 will be in connection with the inlet 11 and the bleed 20 in connection with the bleed portion 21 in the valve body.

Figure 4:
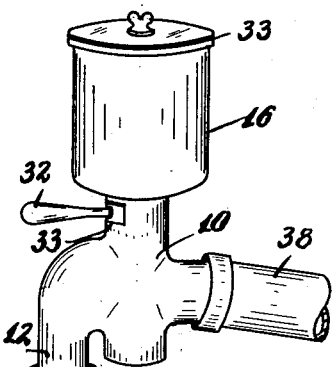
Fig. 4 is a side elevational view of the mixing funnel in conjunction with a spraying device.

In Fig. 4 one specific arrangement for use of the mixing faucet has been shown. A spray pipe 38 is connected with the inlet end 11 of the faucet. Material not shown on the drawing and of a solute nature and which is beneficial, for example, in gardening is placed within the container 16. A spray nozzle 39 is mounted on the outlet 12 of the mixing faucet. A garden may now be sprayed. The handle 32 may be placed in a position so that the liquid which comes through the solute container and dissolves from the material which is sprayed out at 39 or the handle 32 may be moved so that the liquid from the line 38 is discharged directly through the spraying nozzle 39.

Figure 5:
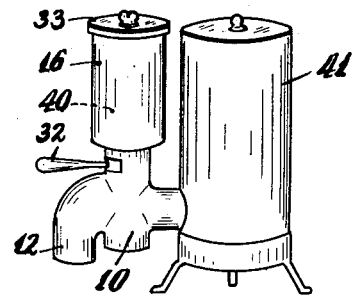
Fig. 5 is a side elevational view of the mixing faucet in conjunction with a coffee manufacturing device.
Figure 2:
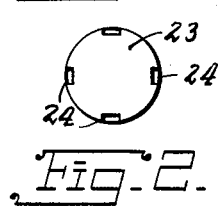
Fig. 2 is a plan view of the nozzle discharge into the solute container.

In Fig. 5 another embodiment of the invention has been disclosed in which the container 16 is shown to hold crystalline coffee 40 and the inlet 11 is shown connected with a hot water or a hot milk boiler 41 so that coffee may be dispensed through the outlet 12.

Figure 6:
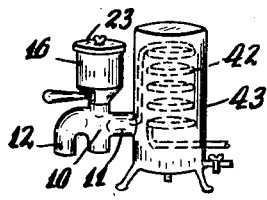
Fig. 6 is a side elevational view, partially shown in section, of the mixing faucet in conjunction with a tea manufacturing device.

In Fig. 6 another variation has been disclosed in which tea, not shown in the drawing, is placed within the solute container 16 and the inlet 11 is shown connected with a hot water supply 42 of a heater 43. This variation allows the dispensing of hot tea.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a mixing faucet having a body with an inlet and an outlet and a solute chamber, means for controlling the passage of fluid from the inlet into said solute chamber, a passage to the outlet from the solute chamber, a funnel within said passage controlling the passage of fluid, a bleed from the inlet to the outer side of the funnel, and means for controlling the passage of fluid from the inlet to the outlet without reaching said funnel.

2. In a mixing faucet having a body with an inlet, and an outlet and a solute chamber with a passage to the outlet, a valve rotatively mounted within the body and having a flange normally closing the passage between the solute chamber and the outlet and having two passages formed in the valve in different parallel horizontal planes and different intersecting vertical planes, and a vertical connection between one of the passages and the solute container, either of said passages being capable of connecting the outlet and the inlet when the valve is in certain rotative positions, and said flange being formed with an aperture so positioned as to open the passage between the solute container and the outlet when the passage having the vertical connection is connecting the outlet with the inlet.

3. In a mixing faucet having a body with an inlet, and an outlet and a solute chamber with a passage to the outlet, a valve rotatively mounted within the body and having a flange normally closing the passage between the solute chamber and the outlet and having two passages formed in the valve in different parallel horizontal planes and different intersecting vertical planes, and a vertical connection between one of the passages and the solute container, either of said passages being capable of connecting the outlet and the inlet when the valve is in certain rotative positions, and said flange being formed with an aperture so positioned as to open the passage between the solute container and the outlet when the passage having the vertical connection is connecting the outlet with the inlet, said passages in the valve being at right angles to each other.

CARL J. SONNER.